United States Patent [19]

Cole

[11] Patent Number: 4,639,133
[45] Date of Patent: Jan. 27, 1987

[54] METHOD AND APPARATUS FOR TESTING THE POWER OF A LENS

[76] Inventor: Rex W. Cole, Warden at Thorpe La., San Marcos, Tex. 78666

[21] Appl. No.: 731,043

[22] Filed: May 6, 1985

[51] Int. Cl.$^4$ .............................................. G01B 9/00
[52] U.S. Cl. .................................................... 356/125
[58] Field of Search ....................... 356/124, 125, 126

[56] References Cited

U.S. PATENT DOCUMENTS

| | | | |
|---|---|---|---|
| 1,015,269 | 1/1912 | Pixley | 356/125 |
| 1,280,045 | 9/1918 | Kuehn | 356/125 |
| 1,474,803 | 11/1923 | Tillyer | 356/125 |
| 1,566,050 | 12/1925 | Tillyer et al. | 356/125 |
| 2,481,716 | 9/1949 | Black | 356/125 |
| 3,436,154 | 4/1969 | Baker et al. | 356/124 |
| 3,820,899 | 6/1974 | McCormack | 356/124 |
| 4,213,701 | 7/1980 | Lanzilloti | 356/124 |

OTHER PUBLICATIONS

McReynolds et al., *American Intraocular Implant Society Journal*, vol. 4, pp. 15–17.

Simcoe, *American Intraocular Implant Society Journal*, vol. 8, Spring 1982, p. 165.

Olson et al., *Archives of Ophthalmology*, vol. 98, Nov. 1980, pp. 2060–2061.

*Primary Examiner*—F. L. Evans
*Attorney, Agent, or Firm*—Norman B. Rainer

[57] ABSTRACT

The power of an intraocular lens is verified under sterile operating room conditions prior to its insertion into a patient's eye. A testing apparatus amenable to single hand operation is utilized which is comprised of two slidably interengaged plates having two series of lenses adapted to be aligned upon optical axes perpendicular to the plates. The aligned lenses constitute adjustable minus power reference lenses. An intraocular lens to be tested is placed atop an appropriate minus power reference lens, and the surgeon views a stationary object through said lens system while moving the apparatus. By observing whether the stationary object appears to move in a direction with or against the lens movement following minor adjustments in the power of the reference lens, the power of the intraocular lens can be determined.

5 Claims, 4 Drawing Figures

METHOD AND APPARATUS FOR TESTING THE POWER OF A LENS

BACKGROUND OF THE INVENTION

This invention relates to the testing of a lens, and more particularly concerns a method and apparatus for verifying the power of an intraocular lens immediately prior to its implantation into a patient's eye.

Intraocular lenses of glass or polymethyl methacrylate are manufactured by a number of different companies. It has been found that a significant percentage of the lenses are mislabeled or are optically aberrant. Accordingly, concientious ophthalmic surgeons strive to verify the characteristics of the lens prior to implantation into the patient's eye. The most significant feature of the lens requiring verification is its power as measured in terms of diopters. A lens having a focal length of 1 meter has a power of 1 diopter. The power (P) of a lens in diopters may be expressed as:

$$P = 1/f$$

where f is the focal length of the lens in meters. Diverging lenses are designated negative lenses, and converging lenses are termed positive lenses. To be acceptable for use, an intraocular lens should test within ±0.5 diopter of its stated power.

Although earlier devices have been known for testing intraocular lenses, such devices, most requiring use of a lensometer, are expensive, time consuming, or incompatible with the sterile requirements of the operating room. Also, some of the earlier testing systems are limited to testing of the lens in either air or aqueous immersion.

It is accordingly an object of the present invention to provide a method for quickly and accurately testing the power of intraocular lenses under sterile conditions.

It is another object of this invention to provide an easily manipulated and easily sterilizable apparatus useful in carrying out the test method of the foregoing object.

It is a further object of the present invention to provide an apparatus of the aforesaid nature capable of providing test results in air.

It is still another object of this invention to provide an improved lens testing apparatus of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with one aspect of the present invention by a method comprising:
(a) placing the lens to be tested in axial alignment with the optical axis of an adjustable minus power reference lens, thereby forming a combined reference lens system of additive power,
(b) viewing an object through said combined lens system in a manner such that relative movement is produced between said object and lens system,
(c) determining whether said object appears to move in the direction of movement of the lens system, or in a direction opposite to the direction of movement of the lens system, and
(d) finding when said apparent direction of movement reverses by adjustment of the reference lens system by one diopter of power.

In a second aspect of the present invention, apparatus is provided for conducting the aforesaid testing method, said apparatus comprising:
(a) a first rigid substantially flat plate of elongated rectangular configuration having two long sides and two short sides, and having a first series of circular apertures positioned in a straight line adjacent one long side and holding minus lenses of equal diameter on optical axes perpendicular to said plate, said lenses having dioptric powers between about −10 and −30 as measured in water sequentially arranged within said series,
(b) a second rigid plate having a second series of circular apertures positioned in a straight line and adapted to align with the apertures of said first series, said second series of apertures containing lenses of low dioptric power ranging from about +1 to −4 disposed on optical axes adapted to coincide with the axes of the lenses of said first series, and indexing ridges associated with said lenses and extending upwardly from said plate,
(c) means to permit sliding interengagement of said first and second plates in a manner permitting coaxial alignment of lenses of said first and second series, and
(d) indicia on each plate designating the power of each lens.

In preferred embodiments of the invention, the plates are fabricated of metal or sterilizable plastic. The means to permit sliding interengagement of the plates is preferably a track and groove structure integral with said plates. The lenses of said second series are preferably adapted to be disposed beneath the lenses of the first series. The length of the second plate is preferably not greater than half the length of the first plate.

In general, the method and device of the present invention are based upon two well known principles of optics:
(1) The magnifying or reducing capability or "power" of lenses are additive when lenses are stacked along the same axis. For example, if a −3 power lens is placed atop a +9 power lens, the power of the resultant combination is +6.
(2) when viewing a stationary object such as a straight line through a lens, movement of a minus power lens will cause the straight line to appear to move in the direction of movement of the lens. If the lens is of positive power, the line will appear to move in a direction opposite to the direction of movement of the lens. The same relationships are observable with non-straight viewed objects and when moving the viewed object relative to a stationary lens.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 3:
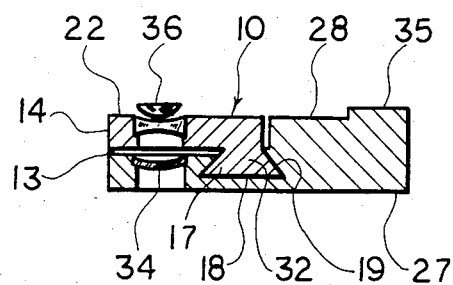
FIG. 3 is an end view of the apparatus of FIG. 1.

For convenience in description, the terms "front" and "rear", or words of similar import, will have reference to the left and right ends, respectively, of the apparatus as shown in FIG. 3. Similarly, the terms "outward" or "inward" or equivalents thereof will have reference to the geometric center of said apparatus.

DESCRIPTION OF THE PREFERRED EMBODIMENT

Referring to the drawing, an embodiment of the apparatus of this invention is shown comprised of first rigid plate 10 of elongated rectangular configuration in sliding engagement with second rigid plate 11. Plate 10 has flat upper and lower surfaces 12 and 13, respectively, and is further defined by outwardly directed long edge 14, inwardly directed long edge 15, and short end edges 16. Track means 17 of uniform trapezoidal cross section traverses the length of plate 10 as a continuous integral extension of lower surface 13 in parallel disposition to edges 14 and 15. Plate 10 may be further characterized as having a plane of symmetry 20 that vertically bisects the plate.

A series of four circular apertures 21 are evenly disposed about said plane of symmetry and centered upon a straight line that parallels long edge 14 in close proximity thereto. A doubly concave minus lens 22 is held within each aperture 21 in a manner such that the optical axis of the lens is perpendicular to upper surface 12 and the upper extremity of the lens extends above upper surface 12. The optical power of the lenses in the series is arranged in stepwise sequence. Indicia appear beneath each lens upon upper surface 12 designating the power of the lens.

In a typical embodiment of the apparatus, plate 10 will have a thickness of about 4 millimeters, a length of about 122 millimeters, and a width, measured between said long edges, of about 25 millimeters. The lenses will typically be of about 5.5 millimeter diameter and spaced 3 millimeters apart.

Figure 1:
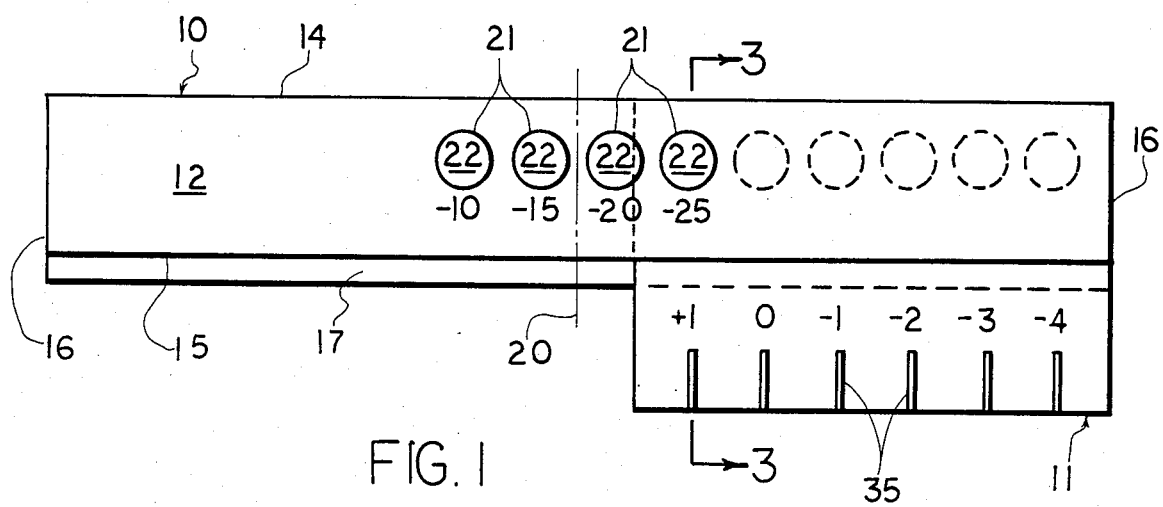
FIG. 1 is a top plan view of an embodiment of the apparatus of this invention.
Figure 2:
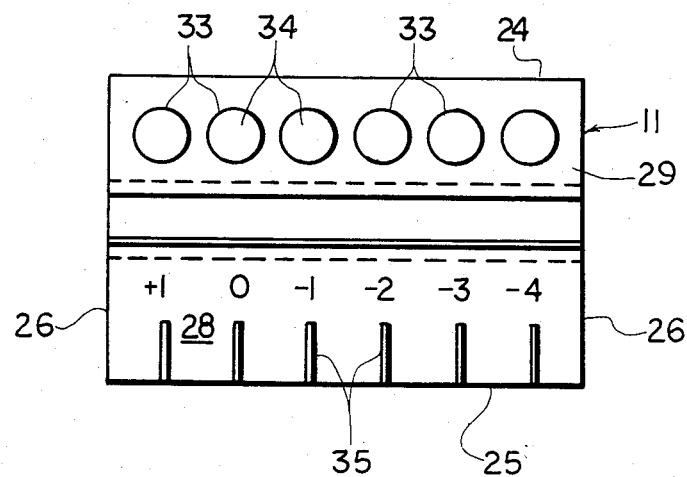
FIG. 2 is a top plan view of the second plate component of the apparatus of FIG. 1.

Second plate 11 is of generally rectangular configuration, having forward and rearward long edges 24 and 25, respectively, as best shown in FIG. 2, side edges 26, flat bottom 27, upper surface 28, and flat bed surface 29. A groove 18 is recessed into bed surface 29 in parallel disposition to long edges 24 and 25, said groove having inwardly convergent surfaces and adapted to slideably engage track 17 of said first plate.

A series of six circular apertures 33 of equal diameter are centered upon a straight line that parallels edge 24 in close proximity thereto. The diameter of apertures 33 and their spacing are the same as those of apertures 21 of said first plate. A plano concave lens 34 is held within each aperture 33 in a manner such that the optical axis of the lens is perpendicular to bed surface 29. The optical power of the lenses in the series is arranged in stepwise sequence. Indicia appear opposite each lens upon upper surface 28 designating the power of the lens.

By virtue of the interengagement of track 17 with groove 18, the two plates are slidably interengaged in a manner such that the spacing between bed surface 29 of plate 11 and lower surface 13 of plate 10 is held constant, and lenses 34 are capable of passing beneath lenses 22 in axial alignment therewith. It is important that the length of the second plate, measured between side edges 26, be less than half the length of the first plate in the exemplified embodiment. By virtue of its shorter length, the second plate can position any one of its lenses beneath any of the lenses 22 of the first plate. A series of indexing ridges 35 of elongated straight contour protrude upwardly from surface 28 and perpendicularly meet rearward edge 25. In the exemplified embodiment, the thickness of the second plate measured at bed surface 29 is 5 millimeters, and the thickness at upper surface 28 is 12 millimeters. The width of plate 11 is 50 millimeters between long edges, and its length is 80 millimeters.

Figure 4:
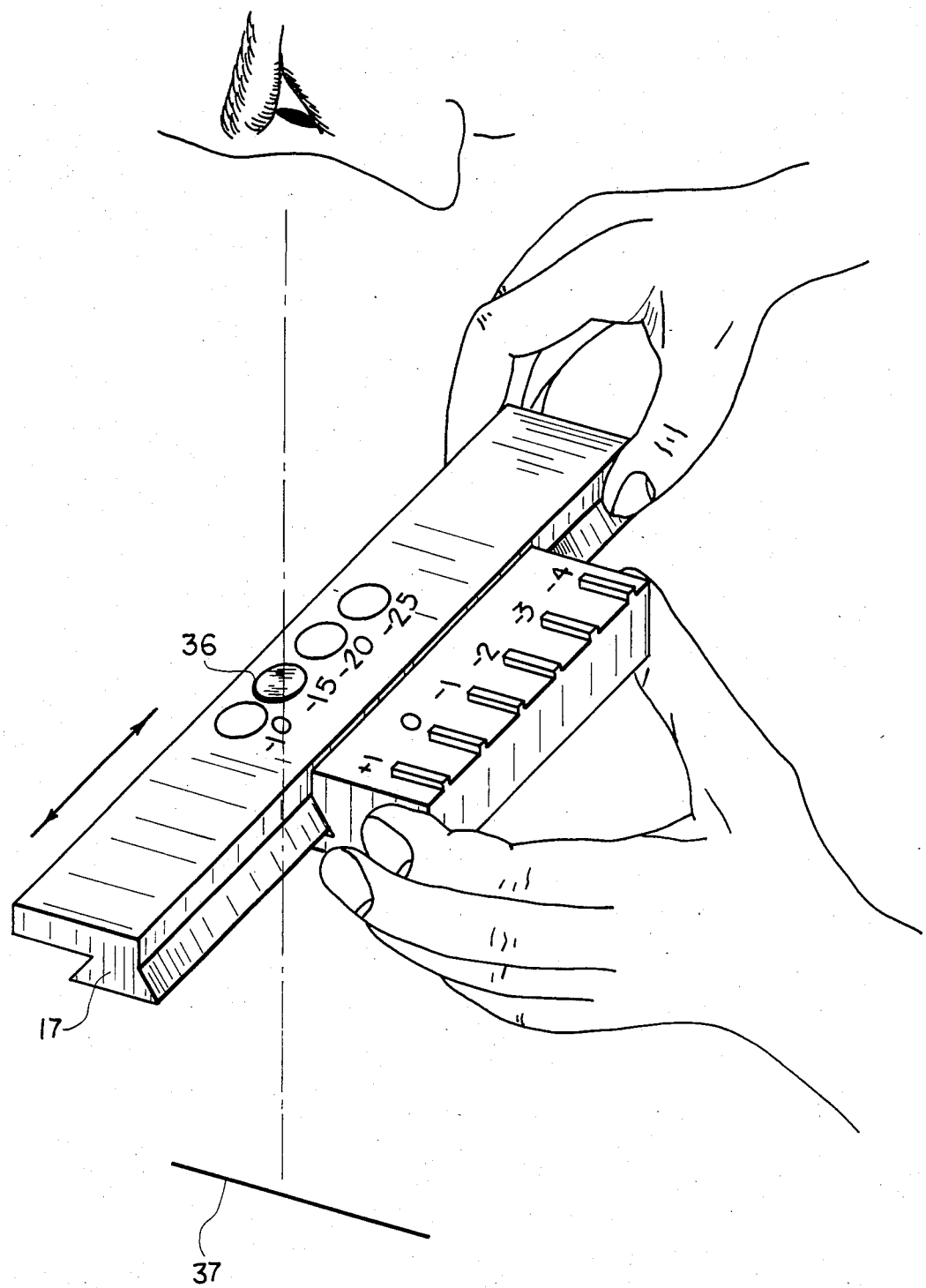
FIG. 4 is a perspective view of the apparatus illustrating its manner of use.

In use, an intraocular lens to be tested, such as planoconvex lens 36 as shown in FIG. 3, is placed in the meniscus of a minus lens 22 of said first plate. The power of the intraocular lens will generally be in the range of +9 to +29 in water. The apparatus is handheld by the surgeon who sights through the stack of lenses comprising the intraocular lens and underlying lenses 22 and 34, as shown in FIG. 4, looking at a stationary line 37 which may be on the floor of the operating room or may be an edge of a cabinet, or a door, or an equipment stand, or other feature of common occurrence in an operating room. The apparatus is moved sideways, as shown by the arrows in FIG. 4, while different lenses of the second plate are slid beneath the lens 22 which holds the intraocular lens, and while line 37 is being viewed.

As a specific example of the testing method, if the surgeon is handed an intraocular lens which is labeled as +21.00 diopters, he would place this lens convex side down upon the lens 22 of the first plate labeled −20 diopters. He would then slide the second plate so that the −2 diopter lens would be beneath the −20 diopter lens. This produces a total dioptric power of the combined stack of lenses of −1. The apparatus is then moved back and forth while observing movement of a stationary line. The line should appear to move in the same direction as the apparatus. The second plate is then slid to replace the −1 lens with the 0 lens (or empty aperture). Such action produces a total dioptric power of the lens combination of +1. By again moving the apparatus while viewing the stationary line, the line should appear to move in a direction opposite to the direction of movement of the apparatus. The second plate would then be slid to position the −1 lens below the intraocular lens. This should produce a total power of zero, and the stationary line observed through such lens combination should not move at all. If such observations are in fact made, it indicates that the labeled power of the intraocular lens is accurate to ±0.5 diopters of its stated power.

The indexing ridges 35 of the second plate facilitate sliding manipulation by the surgeon, permitting single hand operation. In certain embodiments, click-stops may be provided so that the lenses of the two plates are more assuredly brought into coaxial alignment. In still other embodiments, the first plate may be of thicker design, having its testing lenses recessed within apertures 21 to form cup-like structures capable of retaining a saline solution in which the intraocular lens may be immersed to measure its power under aqueous or in vivo conditions.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for testing the power of an intraocular lens comprising:
  (a) a first rigid substantially flat plate of elongated rectangular configuration having two long sides and two short sides, and having a first series of circular apertures positioned in a straight line adjacent one long side and holding minus lenses of equal diameter on optical axes perpendicular to said plate, said lenses having dioptric power between about −10 and −30 as measured in water sequentially arranged within said series,
  (b) a second rigid plate having a second series of circular apertures positioned in a straight line and adapted to align with the apertures of said first series, said second series of apertures containing lenses of low dioptric power ranging from about +1 to −4 disposed on optical axes adapted to coincide with the axes of the lenses of said first series, and indexing ridges associated with said lenses and extending upwardly from said plate,
  (c) means to permit sliding interengagement of said first and second plates in a manner permitting coaxial alignment of lenses of said first and second series, and
  (d) indicia on each plate designating the power of each lens.

2. The apparatus of claim 1 wherein said plates are fabricated of sterilizable material.

3. The apparatus of claim 1 wherein the means to permit sliding interengagement of the plates is a track and groove structure integral with said plates.

4. The apparatus of claim 1 wherein the lenses of said second series are adapted to be disposed beneath the lenses of the first series.

5. The apparatus of claim 1 wherein the length of the second plate is not greater than half the length of the first plate.

* * * * *